US009373054B2

(12) United States Patent
Loui et al.

(10) Patent No.: US 9,373,054 B2
(45) Date of Patent: Jun. 21, 2016

(54) METHOD FOR SELECTING FRAMES FROM VIDEO SEQUENCES BASED ON INCREMENTAL IMPROVEMENT

(71) Applicant: Kodak Alaris Inc., Rochester, NY (US)

(72) Inventors: Alexander C. Loui, Penfield, NY (US); David K. Rhoda, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/475,074

(22) Filed: Sep. 2, 2014

(65) Prior Publication Data

US 2016/0063343 A1    Mar. 3, 2016

(51) Int. Cl.
    *G06K 9/46*      (2006.01)
    *G06K 9/66*      (2006.01)
    *G06K 9/62*      (2006.01)

(52) U.S. Cl.
CPC ............ *G06K 9/4604* (2013.01); *G06K 9/6202* (2013.01); *G06T 2207/10016* (2013.01)

(58) Field of Classification Search
CPC ................... G06T 2207/10016; G06T 7/0042; G06K 9/007656
See application file for complete search history.

(56) References Cited

U.S. PATENT DOCUMENTS

| | | | | |
|---|---|---|---|---|
| 6,549,643 | B1 * | 4/2003 | Toklu | ............... G06F 17/30802 348/571 |
| 7,027,513 | B2 * | 4/2006 | Zhang | ............... G06F 17/30811 348/222.1 |
| 7,184,100 | B1 * | 2/2007 | Wilf | ...................... G11B 27/28 348/700 |
| 7,889,794 | B2 | 2/2011 | Luo et al. | |
| 8,467,611 | B2 * | 6/2013 | Kumar | ............... G06K 9/00744 382/195 |
| 8,599,313 | B2 | 12/2013 | Barenbrug et al. | |
| 9,076,043 | B2 * | 7/2015 | Kumar et al. | |
| 2006/0110128 | A1 * | 5/2006 | Dunton et al. | ................... 386/52 |
| 2006/0228029 | A1 * | 10/2006 | Zhang | ............... G06K 9/00711 382/232 |
| 2007/0147504 | A1 * | 6/2007 | Wang | ................ G06F 17/30802 375/240.13 |
| 2011/0295851 | A1 * | 12/2011 | El-Saban | ............ G06F 17/3082 707/728 |
| 2013/0215221 | A1 * | 8/2013 | Wang | ................... G06T 7/0042 348/43 |

OTHER PUBLICATIONS

Xiao Zeng et al "Instant video summarization during shooting with mobile phone," Proceedings of the 1st ACM International Conference on Multimedia Retrieval, ICMR '11, Jan. 1, 20011, pp. 1-8.
Yuli Gao et al., "Thematic video thumbnail selection," Image Processing (ICIP), 2009 16th IEEE international Conference on IEEE, Nov. 7, 2009, pp. 4333-4336.

(Continued)

*Primary Examiner* — Gregory M Desire
(74) *Attorney, Agent, or Firm* — Hogan Lovells US LLP

(57) ABSTRACT

The present application is directed to new methods for automatically and effectively combining multiple metrics to select interesting, or key, frames from a video sequence. In one aspect, the methods include selecting a reference frame from a video sequence and iteratively computing the improvement or gain in the combined metrics for candidate frames with respect to that reference frame. In another aspect, a master list of reference key frames is determined, quality metrics are calculated for each of a plurality of candidate frames associated with each reference key frame, and each reference key frame in the master list is replaced with a candidate frame that yields the greatest aggregate quality improvement over that reference key frame.

13 Claims, 9 Drawing Sheets

(56) References Cited

OTHER PUBLICATIONS

Kaneswaran Anantharajah et al., "Quality based frame selection for video face recognition," Signal Processing and Communication Systems (ICSPCS), 2012 6th International Conference on IEEE, Dec. 12, 2012, pp. 1-5.

Notification of Transmtal of the International Search Report and the Written Opinion of the International Searching Authority, or the Declaration, International Search Report and Written Opinion mailed Dec. 12, 2015.

* cited by examiner

METHOD FOR SELECTING FRAMES FROM VIDEO SEQUENCES BASED ON INCREMENTAL IMPROVEMENT

TECHNICAL FIELD

This invention pertains to the field of video processing, and more particularly to improved methods for selecting key frames from videos.

BACKGROUND OF THE INVENTION

Selection of key video frames is useful in many applications. For example, it is often desirable to extract and present some subset of video data that can convey an accurate and recognizable summary or synopsis of the video. Key frame extraction algorithms are used to select a subset of the most informative frames from a video, with the goal of representing the most significant content of the video with a limited number of frames. Key frame extraction finds applications in several broad areas of video processing such as video summarization, creating chapter titles in DVDs, video indexing, and making prints from video. Summaries or synopses can also facilitate video sharing or help a user decide whether a full video is worth downloading or viewing. Key frame extraction is an active research area, and many approaches for extracting key frames from videos have been proposed.

Algorithms for creating a video summary by extracting key video frames are known in the art, but have shortcomings that are addressed by the present invention. Existing algorithms, such as that disclosed in U.S. Pat. No. 8,599,313 to Aaron T. Deever, which determines key video frames based primarily on inter-frame motion detection, suffer from at least two shortcomings. These algorithms either do not consider quality metrics to aid in the selection of key frames, or require extensive joint optimization of multiple metrics, an approach that is computationally expensive.

For instance, the method of U.S. Pat. No. 7,889,794 to J. Luo, et al., entitled Extracting key frames candidates from video clip, analyzes a video clip to determine key frames by performing a global motion estimate on the video clip that indicates translation of a scene or camera. As an additional example, U.S. Pat. No. 7,184,100, to I. Wilf, et al., entitled Method of selecting key-frames from a video sequence, teaches the selection of key frames from a video sequence by comparing each frame in the video sequence with the adjacent frames using both region and motion analysis.

The prior art methods do not include or combine other non-motion-based metrics, such as image quality or semantic content of the video frames, to improve the quality of the key frame selection process. Integrating such metrics into these methods would require a new complex and time consuming optimization process. Hence there is a need to develop new strategies to improve the current algorithms using additional quality metrics. It is one object of the present invention to select key frames that are perceptually better than the key frames selected by conventional, motion-based methods, with a slight impact on computational cost. It is a further object of the present invention to improve existing algorithms by incorporating new metrics without the need for new optimization of the algorithm or normalization of new features.

SUMMARY

The present application is directed to new methods for automatically and effectively combining multiple metrics to select interesting, or key, frames from a video sequence. In one aspect, the methods include selecting a reference frame from a video sequence and iteratively computing the improvement or gain in the combined metrics for candidate frames with respect to that reference frame. Metrics according to the present invention may include image quality metrics such as sharpness, contrast, and noise; motion-based metrics such as camera shake and motion blur; and aesthetic quality metrics such as composition of the image and facial quality and expressions. In other aspects, the present invention uses other content-based features to develop new metrics for improving the algorithm. These content-based features include color histogram of the image, block color histogram of the image, semantic information of the image, objects in the image, background of the image, and foreground of the image.

In one embodiment, the inventive method comprises calculations for a sharpness metric and a quality of detected human face metric, referred to herein as faceIVI. According to this method, sharpness and faceIVI scores are calculated for each reference key frame and each of a number of candidate frames temporally adjacent to each reference key frame. In other embodiments, the inventive method includes calculations for other metrics.

DETAILED DESCRIPTION

Figure 1A:
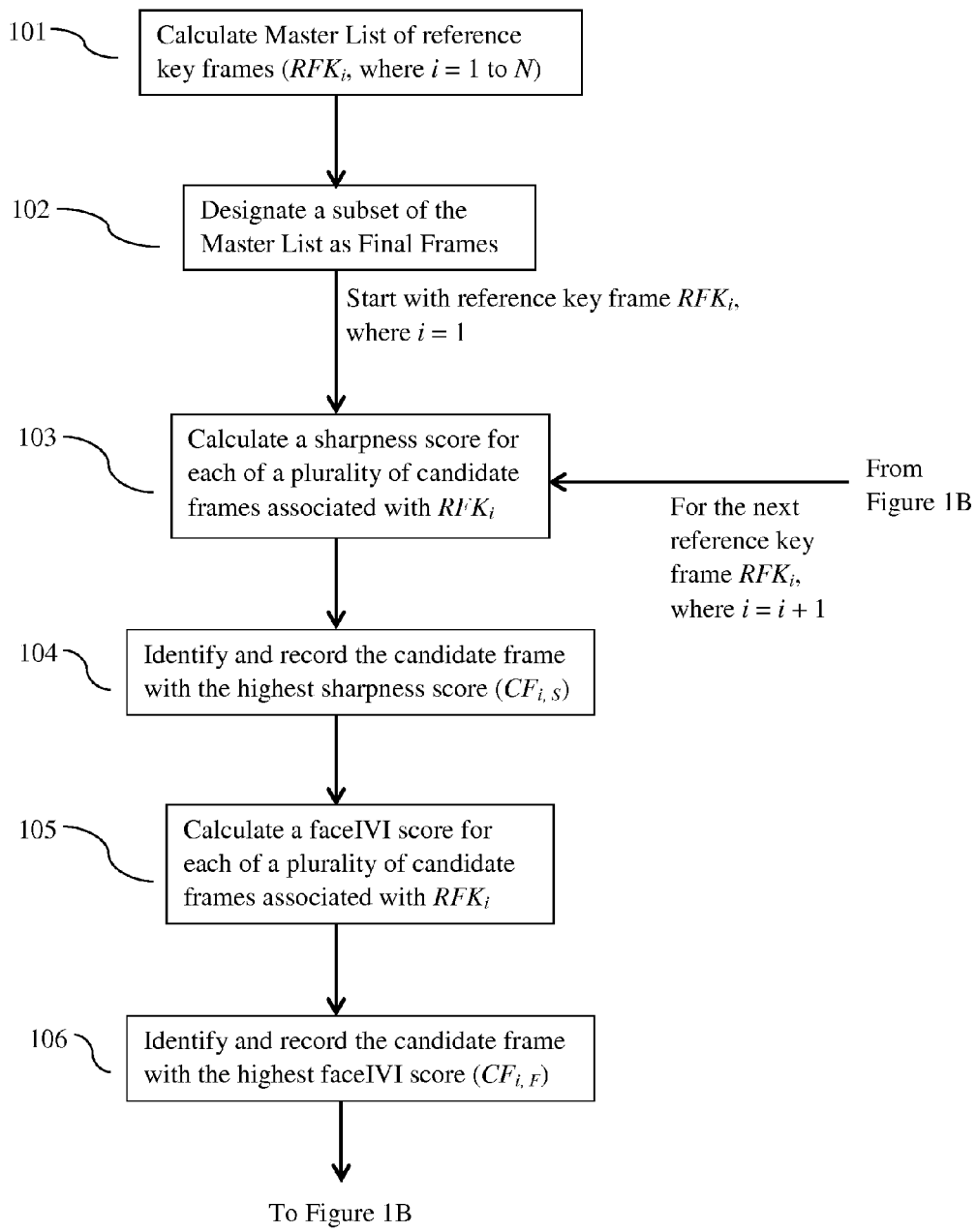
FIGS. 1A-B contain a flow diagram illustrating one method of the present invention.

This application discloses improved methods for selecting key frames from video sequences. As those skilled in the art will appreciate, the inventive methods disclosed in this application are suitable for implementation with many types of key frame selection algorithms. For instance, the methods disclosed in this application may be used to improve key frame selection algorithms that are known in the art, including but not limited to, motion-based algorithms such as the one disclosed in U.S. Pat. No. 8,599,313 to Aaron T. Deever, the disclosure of which is hereby incorporated by reference. Alternatively, the disclosed methods are compatible with algorithms based on shot-boundary detection. In the methods of this invention, the candidate frames are identified by searching in the vicinity of a reference key frame based on certain quality metrics. In one aspect of the invention, the quality metrics used may be a sharpness metric and a quality of detected human face metric, referred to herein as faceIVI.

In the following description, some embodiments of the present invention will be described in terms that would ordinarily be implemented as software programs. Those skilled in the art will recognize that the equivalent of such software may also be constructed in hardware, and that hardware implementations could confer advantages that may enable use of this invention in a wider variety of applications such as in real-time systems. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system according to the invention as described in this disclosure, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The steps of one embodiment of the inventive method will be described with reference to the steps shown in FIGS. 1A-B. Initially, in step 101, a Master List of reference key frames is calculated from a video sequence using a key frame extraction algorithm such as the motion-based algorithms previously mentioned. Other algorithms, such as those based on shot-boundary detection, may also be used. For the purpose of illustration in the following discussion, each reference key frame will be denoted $RKF_i$, where i is an integer between 1 the number of reference key frames in the Master List.

In step 102, a subset of the reference key frames from the Master List are designated as Final Frames based on a single quality metric, a combination of quality metrics, or some other measure. Each of the reference key frames in the Master List are processed identically in steps 103 to 107a-b regardless of whether they are designated Final Frames. This designation is used in step 108.

Steps 103 through 107a or 107b are performed for each reference key frame in the Master List. In step 103, a sharpness score is calculated for each of a plurality of candidate frames that are adjacent to each reference key frame, $RKF_i$, in the Master List. This sharpness score calculation is denoted herein by the notation SHARP (frame). The plurality of candidate frames may be a set number of frames immediately preceding each reference key frame in the video sequence, a set number of frames immediately following each reference key frame in the video sequence, or a set number of frames both preceding and following each reference key frame in the video sequence.

In one aspect of this invention, if the proximity of two reference key frames in the video sequence and the set number of candidate frames is such that a frame in the sequence would be a candidate frame for two reference key frames, the set number of frames is adjusted so that each candidate frame is associated with only one reference key frame. For example, consider a situation in which the plurality of candidate frames is selected as the thirty frames preceding and thirty frames following each reference key frame, yet two adjacent reference key frames selected in step 101 are separated by only twenty frames in the video sequence. In this situation, the plurality of candidate frames for these two reference key frames will be reduced. In one aspect, the earlier of these two reference key frames may be associated with thirty preceding candidate frames and ten following candidate frames, while the later of the two reference key frames may be associated with ten preceding candidate frames and thirty following candidate frames. In other words, the number of intervening candidate frames between the two successive reference key frames is divided by two and the first half is allocated to the plurality of candidate frames considered in conjunction with the earlier reference key frame and the second half are allocated to the plurality of candidate frames considered in conjunction with the later reference key frame.

Figure 2A:
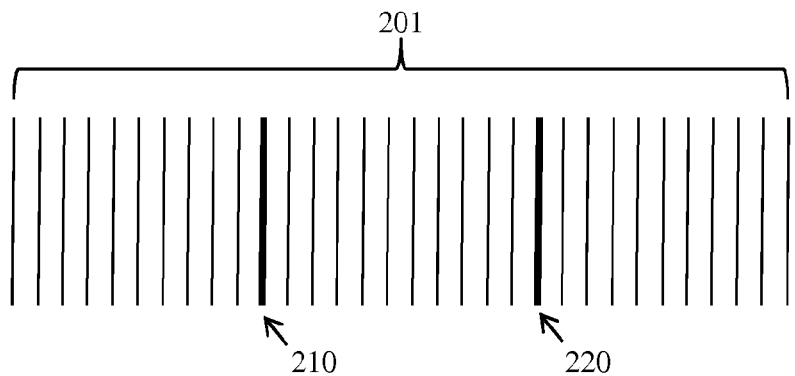
FIG. 2A shows two reference key frames selected from frames in a video sequence.
Figure 2B:
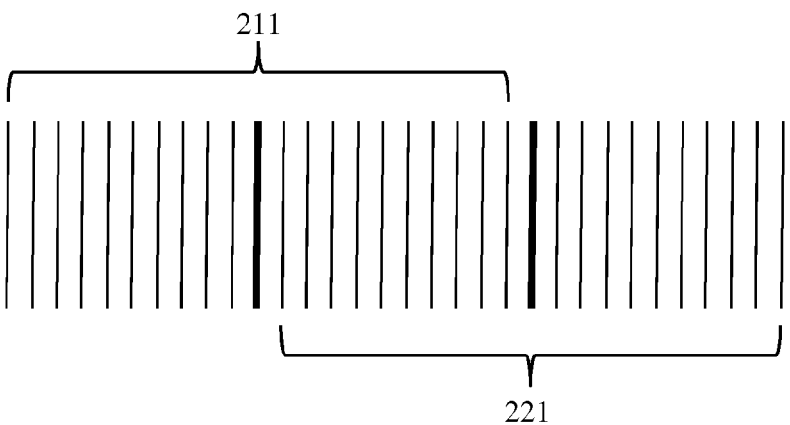
FIG. 2B shows a situation in which the pluralities of candidate key frames associated with two adjacent reference key frames overlap.
Figure 2C:
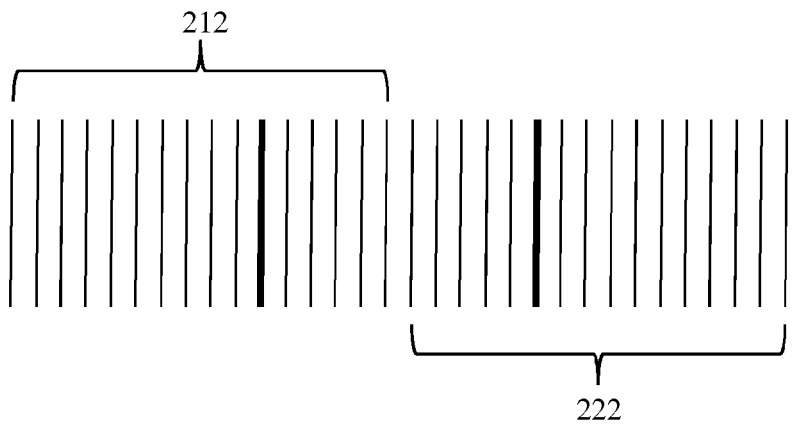
FIG. 2C shows one method of adjusting overlapping pluralities of candidate key frames so that they no longer overlap.

This adjustment is shown in FIGS. 2A-C. In FIG. 2A, reference key frames 210 and 220 have been selected from a segment of a video sequence 201. FIG. 2B illustrates how the plurality of candidate frames 211 (considered in conjunction with the earlier reference key frame 210) would overlap with the plurality of candidate frames 221 (considered in conjunction with the later reference key frame 220). FIG. 2C shows an adjustment whereby the distance between reference key frames 210 and 220 is halved and the first half associated with the earlier plurality of candidate frames 212 and the second half associated with the later plurality of candidate frames 222. The adjustment illustrated in FIGS. 2A-C is just one representative adjustment that could be used within this method.

Figure 1B:
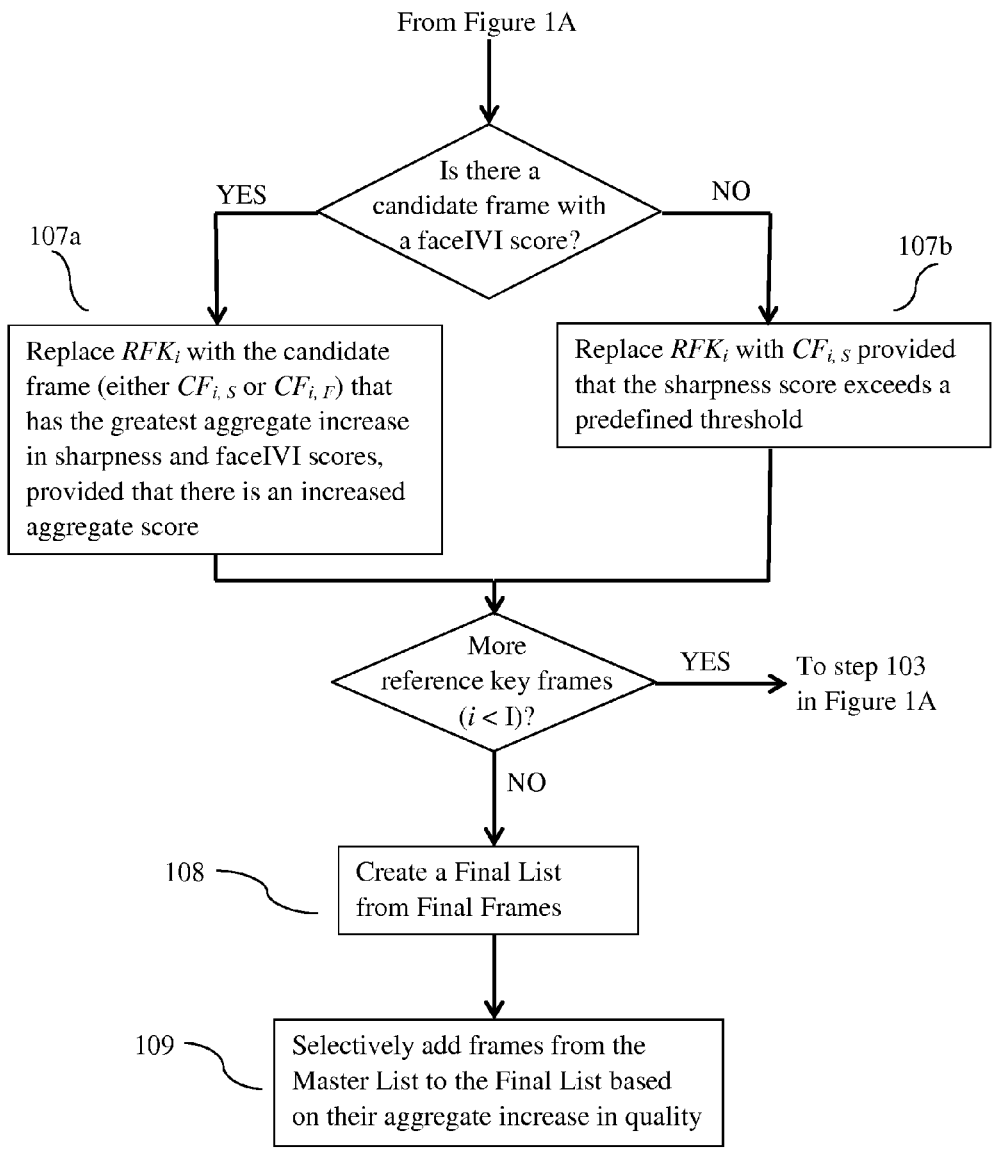

Returning to step 104 in the flowchart in FIGS. 1A-B, for each reference key frame, $RKF_i$, in the Master List, the frame with the highest sharpness score from among the plurality of candidate frames associated with that reference key frame is identified and stored. For the purpose of illustration, the candidate frame with the highest sharpness score associated with reference key frame $RKF_i$ is denoted herein as $CF_{i, Sharp}$.

In step 105, the faceIVI score is calculated for each of a plurality of candidate frames that are adjacent to each reference key frame, $RKF_i$, in the Master List. The faceIVI score is calculated by detecting any region in each candidate frame in which a human face appears and evaluating the quality of that region. This faceIVI score calculation is denoted herein by the notation FACEIVI (frame). Any candidate frame that does not depict a human face for analysis receives no faceIVI score, which may be reflected by a null value, a zero value, or some other indication. The pluralities of candidate frames to be considered in conjunction with each reference key frame are identical between steps 103 and 105, such that the same candidate frames are evaluated for a sharpness score and a faceIVI score. In other words, any adjustment to the plurality of candidate frames due to proximity of reference key frames, as disclosed above, applies to both steps.

In step 106, for each reference key frame, $RKF_i$, in the Master List, the frame with the highest faceIVI score from among the plurality of candidate frames associated with that reference key frame is identified and stored. For the purpose of illustration, the candidate frame with the highest faceIVI score associated with the reference key frame $RKF_i$, is denoted $CF_{i, Face}$. If frames with sharpness and faceIVI scores are recorded, the method proceeds to step 107a. If, on the other hand, there is no candidate frame with a faceIVI score, the method proceeds to step 107b.

In step 107a, the aggregate increase in sharpness and faceIVI scores that would be accomplished by replacing the reference key frame, $RKF_i$, with either the frame with the highest sharpness score, $CF_{i, Sharp}$, or the frame with the highest faceIVI score, $CF_{i, Face}$, are calculated; and the reference key frame, $RKF_i$, is replaced with the candidate frame (either $CF_{i, sharp}$ or $CF_{i, Face}$) that has the greatest aggregate increase. In one aspect of the method, the net increase in sharpness and faceIVI scores are calculated as follows:

$$S_i = \frac{\text{SHARP}(CF_{i,Sharp}) - \text{SHARP}(RKF_i)}{\text{SHARP}(RKF_i)} + \frac{\text{FACE}IVI(CF_{i,Sharp}) - \text{FACE}IVI(RKF_i)}{\text{FACE}IVI(RKF_i)}$$

and $$F_i = \frac{\text{SHARP}(CF_{i,Face}) - \text{SHARP}(RKF_i)}{\text{SHARP}(RKF_i)} + \frac{\text{FACE}IVI(CF_{i,Face}) - \text{FACE}IVI(RKF_i)}{\text{FACE}IVI(RKF_i)}$$

where $S_i$ is the net increase in sharpness and faceIVI scores that would be accomplished by replacing the reference key frame, $RKF_i$, with the frame with the highest sharpness score, $CF_{i, Sharp}$, and $F_i$ is the net increase in sharpness and faceIVI scores that would be accomplished by replacing the reference key frame, $RKF_i$, with the frame with the highest faceIVI score, $CF_{i, Face}$.

However, if the aggregate increases in sharpness and faceIVI scores ($S_i$ and $F_i$) for both candidate frames ($CF_{i, Sharp}$ and $CF_{i, Face}$) are negative, the reference key frame, $RKF_i$, is not replaced by either candidate frame, but retained in the Master List.

It is possible to arrive at step 107a when the reference key frame, $RKF_i$, contains no detected face regions if one of its associated candidate frames has a detected face region. In this situation, evaluation of $F_i$ by division by FACEIVI ($RKF_i$) is not possible. In this event, the second term of $F_i$ may be set to a predetermined value commensurate with the relative desirability of including human faces in the video summary. This predetermined value could be 1.0, if the designer highly values faces in the video summary, or some lesser value if the designer wishes to strike a different balance between the quality metrics. The calculation of $S_i$ will suffer the same issue if the frame with the highest sharpness score, $CF_{i, sharp}$, has any detected face regions, and therefore FACEIVI ($CF_{i, sharp}$) can be evaluated to a non-zero value. In this event, the second term of $S_i$ may also be set to a predetermined value, similar to the second term of $F_i$. Otherwise, if the frame with the highest sharpness score, $CF_{i, sharp}$, does not have any detected face regions, the second term of $F_i$ can be evaluated as zero.

If there are more reference key frames in the Master List after step 107a, the method continues with the next reference key frame in step 103. Otherwise, the method continues on to step 108.

In step 107b, when no candidate frame is assigned a faceIVI score for reference key frame $RKF_i$, the reference key frame is replaced by the candidate frame with the highest sharpness score, $CF_{i, Sharp}$, provided that the sharpness score for this frame, SHARP ($CF_{i, Sharp}$), exceeds a predefined threshold. If there are more reference key frames in the Master List after step 107b, the method continues with the next reference key frame in step 103. Otherwise, the method continues in step 108.

In step 108, a Final List is created from the key frames in the Master List that were designated as Final Frames in step 102 as they have been modified by replacement in steps 103 through 107a-b.

In step 109, key frames from the Master List that were not designated as Final Frames in step 102 are selectively added to the Final List based on the aggregate increase in quality accomplished in steps 103 through 107a-b, such that the Final List includes each of these key frames for which the aggregate increase in sharpness and faceIVI scores surpass a predefined threshold. For example, if a reference key frame ($RKF_i$) was not initially designated as a Final Frame, but was replaced with a frame from the plurality of associated candidate frames and the aggregate increase in quality for that frame ($S_i$ or $F_i$, as applicable) exceeds a predefined threshold, that reference key frame is added to the Final List. Otherwise, reference key frame ($RKF_i$) is discarded and does not appear in the Final List.

Figure 3:
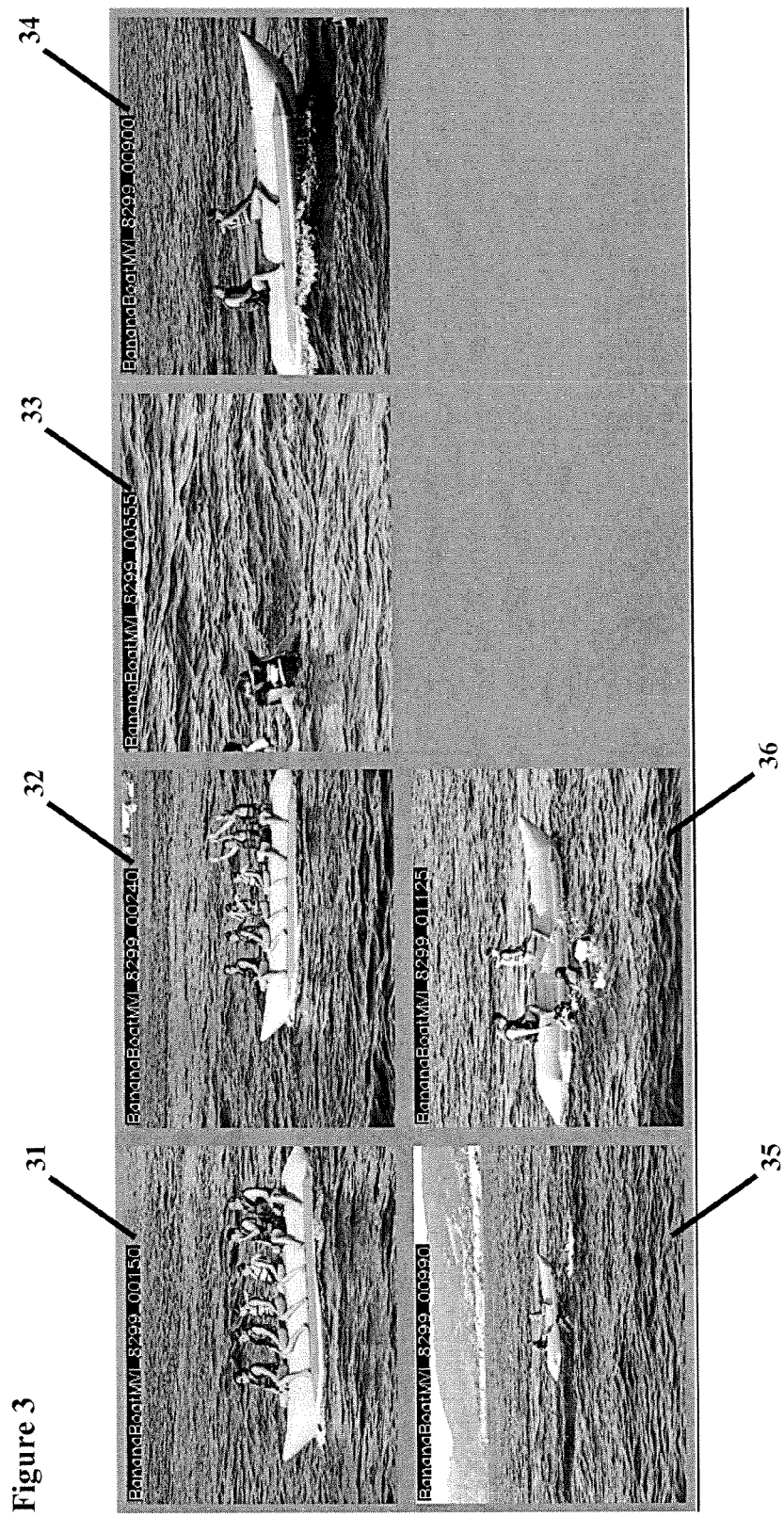
FIG. 3 is an example illustrating a Master List output from a motion-based key frame extraction algorithm.

FIGS. 3 through 7 illustrate an example of the various reference key frames and candidate frames at the various stages of the method. FIG. 3 is an example illustrating a Master List output from a motion-based key frame extraction algorithm as identified in step 101. In this example, the Master List contains six reference key frames 31-36 and reference key frames 34-36 are designated Final Frames.

Figure 4:
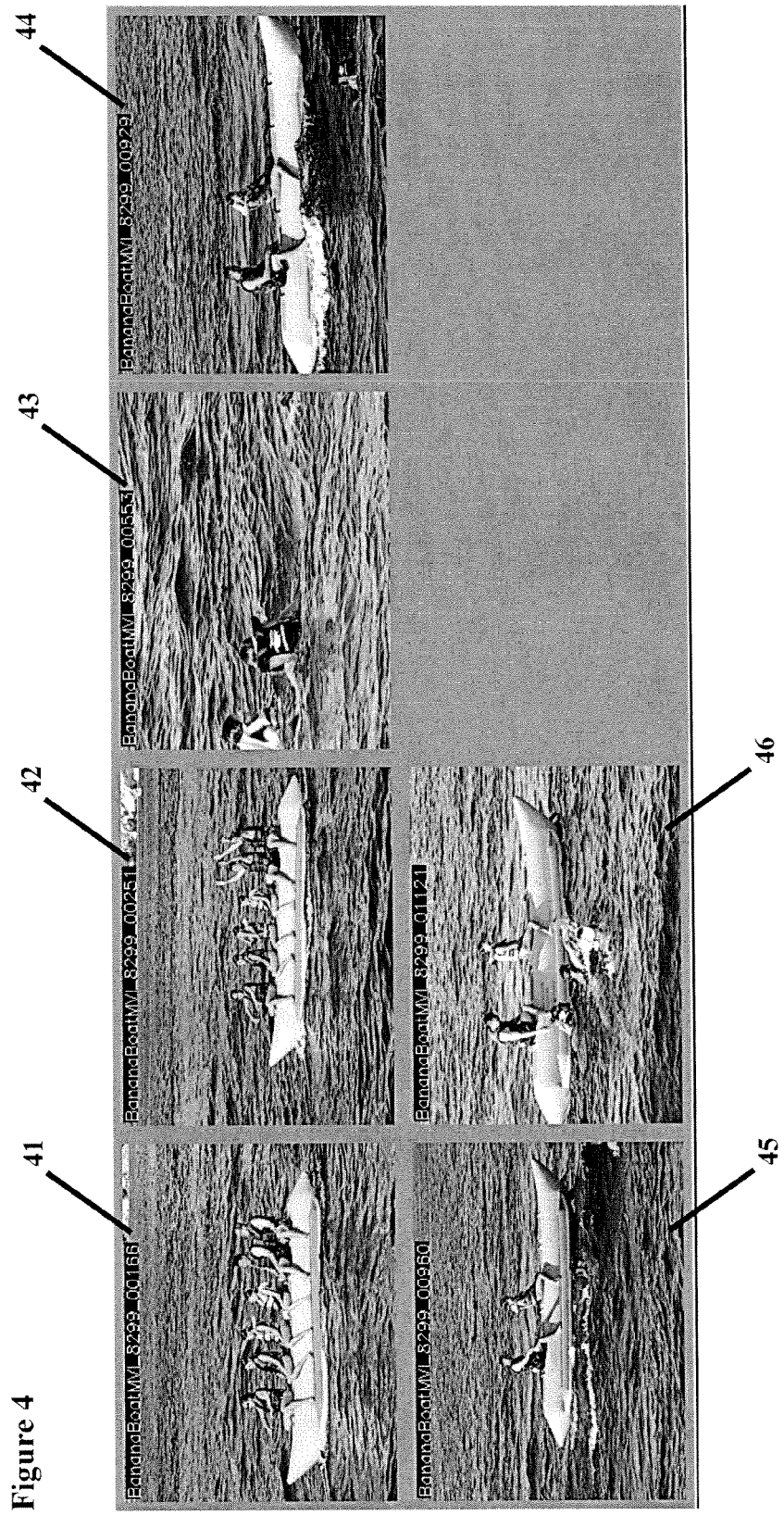
FIG. 4 is an example illustrating the candidate frames within a predefined search range of the corresponding Master List frames with the highest image sharpness score.

FIG. 4 shows the candidate frames 41-46 selected in step 104, which are frames within a predefined search range of each reference key frame that have the highest image sharpness score.

Figure 5:
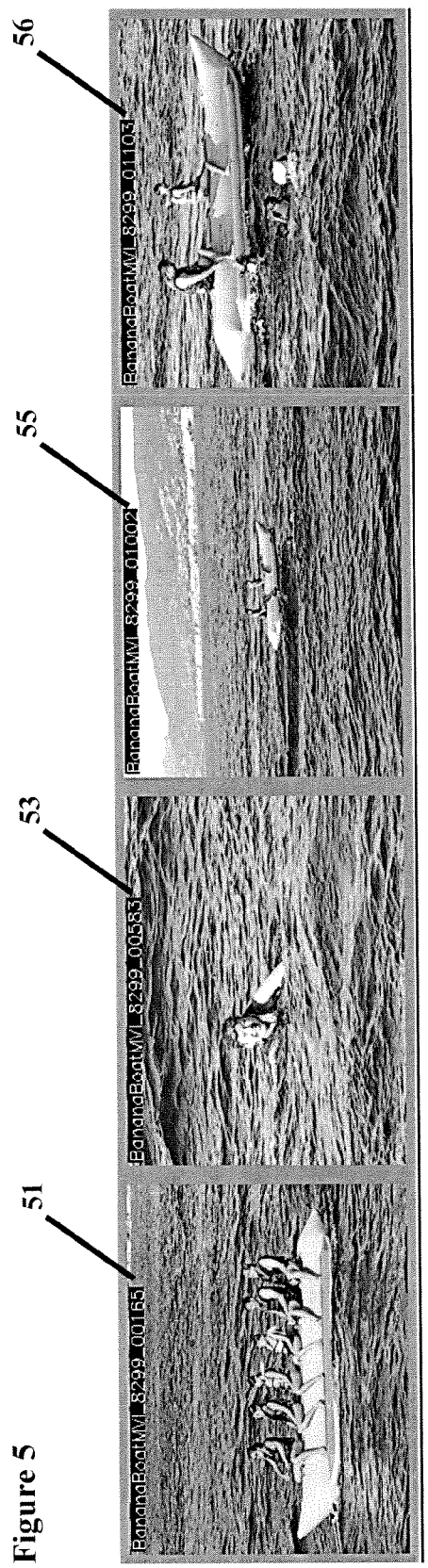
FIG. 5 is an example illustrating the candidate frames within a predefined search range of the corresponding Master List frames with the highest faceIVI score.

FIG. 5 shows the candidate frames 51, 53, 55 and 56 selected in step 106, which are frames within a predefined search range of each reference key frame that have with the highest faceIVI score. There are no frames corresponding to reference key frames 32 and 34 because no detectable faces were found in any of the candidate frames associated with those reference key frames.

Figure 6:
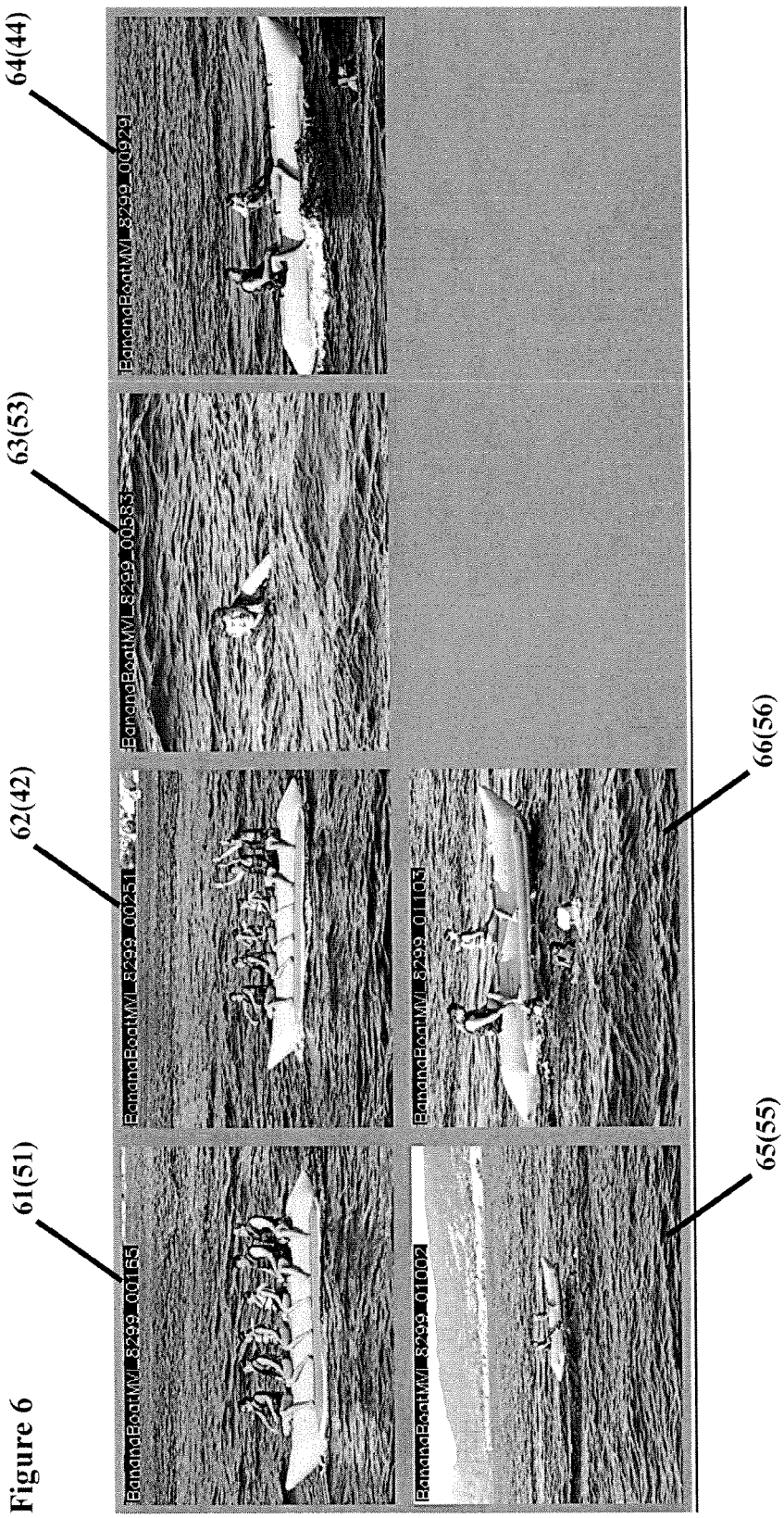
FIG. 6 is an example illustrating the Master List after merging outputs from FIGS. 4 and 5 according to the method of the present invention.

FIG. 6 is an example illustrating the Master List after performing steps 107a and 107b for each reference key frame. The source of each key frame is indicated in parentheses. For example, the first key frame 31 was replaced with candidate frame 51 (a frame with the highest faceIVI score), which appears in FIG. 6 as key frame 61; key frame 32 was replaced with candidate frame 42 (a frame with the highest sharpness score), which appears in FIG. 6 as key frame 62; and so forth.

Figure 7:
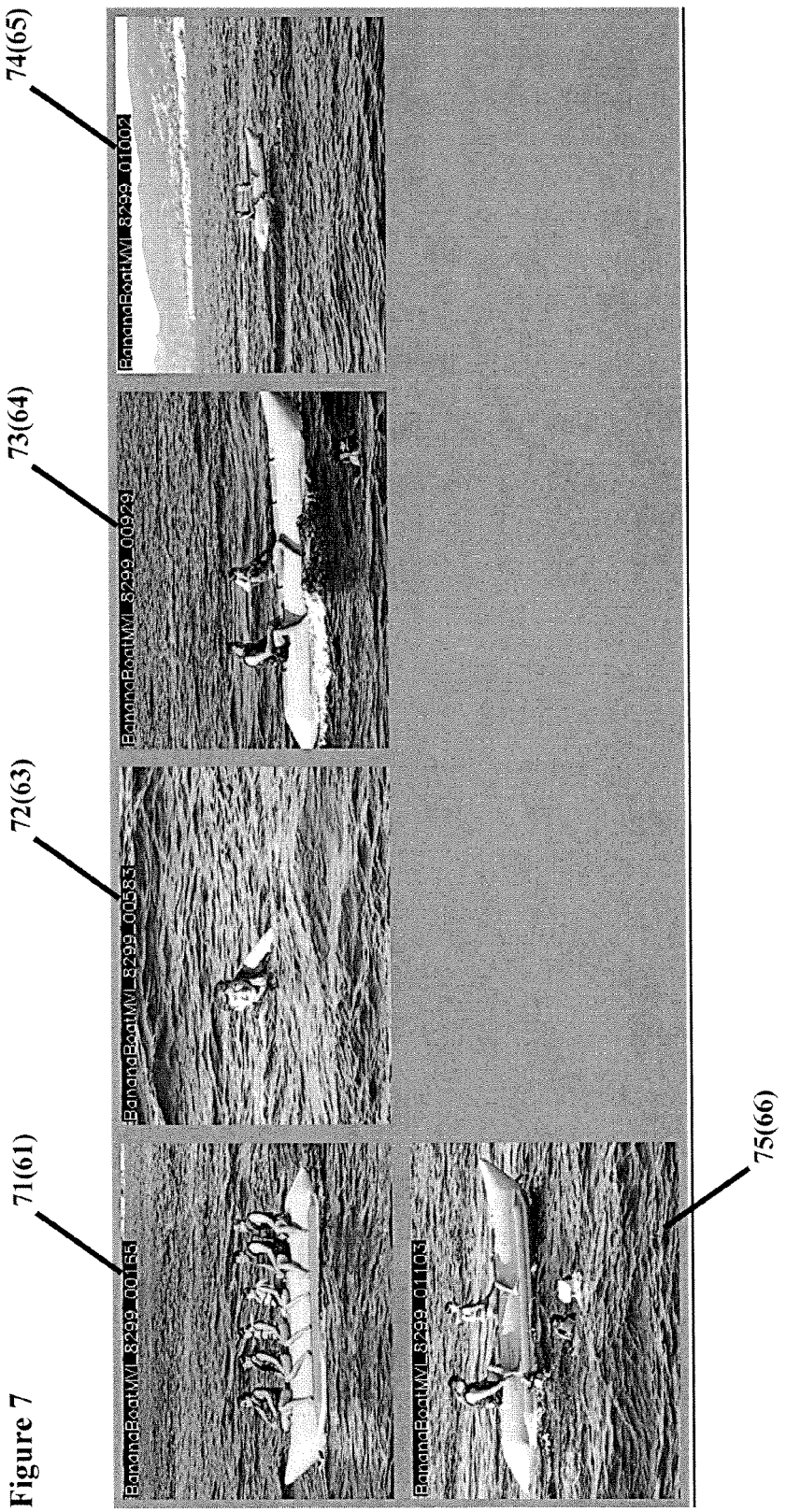
FIG. 7 is an example illustrating the Final List of key frames selected from the Master List of FIG. 6.

FIG. 7 is an example illustrating the Final List of key frames selected from the Master List of FIG. 6 as specified in steps 108 and 109. Frames 73 to 75 were selected for the Final List as Final Frames in step 108. Frames 71 and 72 were selected in step 109 because their aggregate increase in quality was sufficiently high to exceed the predetermined threshold. The second key frame from the Master List in FIG. 6 has been omitted. This final output is both more representative than the original list of Final Frames created at step 102 and more concise than the original Master List produced at step 101.

In an alternative embodiment of the inventive method, steps 102, 108 and 109 are omitted, such that all key frames in the Master List appear in the Final List.

The main advantage of the methods disclosed in this invention is that different metrics can be used without carrying out a whole new optimization procedure or an extensive normalization (due to different dimensionality of features) process. The essence of the methods disclosed herein is to determine the net increase or decrease in quality when evaluating a new candidate frame with respect to a reference key frame considering all the metrics. Hence new metrics can easily be incorporated into the algorithm in a modular fashion. The set of frames on which these methods operate can be selected or extracted from any type of image sequences, not restricted to a video sequence. For example, the set of frames could be from a set of images captured in an event, or from a mix of still images and frames from a video sequence.

Figure 8:
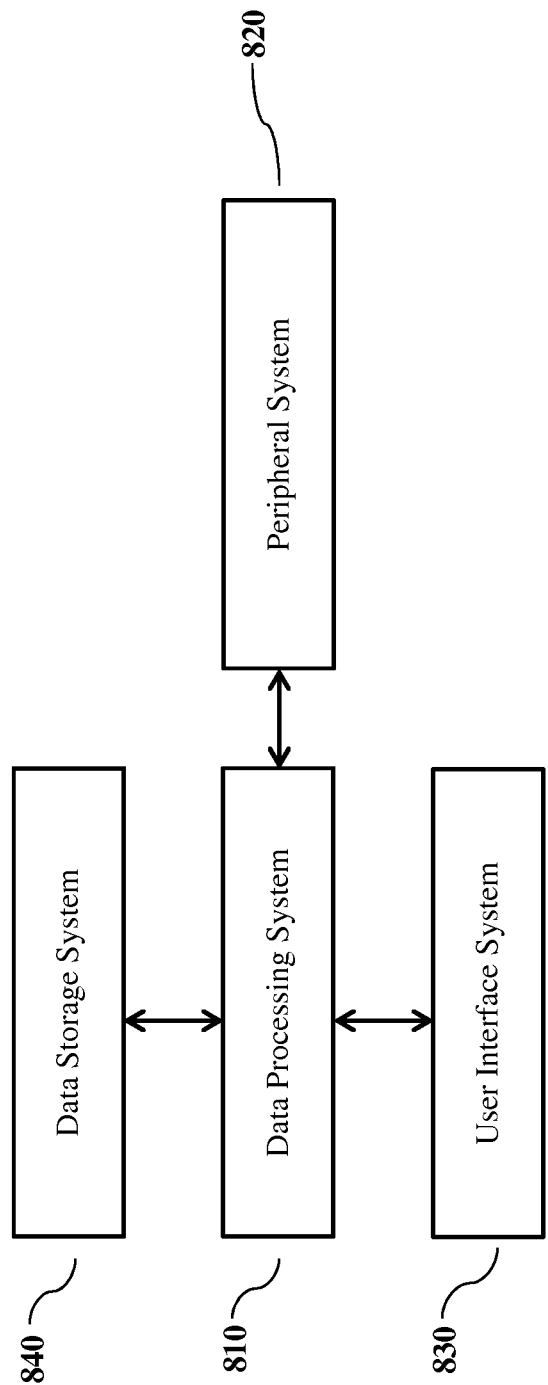
FIG. 8 is a high-level diagram showing the components of a system according to an embodiment of the present invention.

FIG. 8 is a high-level diagram showing the components of a system for identifying and improving a set of key frames from a video sequence according to an embodiment of the present invention. The system includes a data processing system 810, a peripheral system 820, a user interface system 830, and a data storage system 840. The peripheral system 820, the user interface system 830 and the data storage system 840 are communicatively connected to the data processing system 810.

The data processing system 810 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a digital camera, cellular phone, or any other device for processing data, managing data, or handling data, whether implemented with electrical, magnetic, optical, biological components, or otherwise.

The data storage system 840 includes one or more processor-accessible memories configured to store information, including the information needed to execute the processes of the various embodiments of the present invention, including the example processes described herein. The data storage system 840 may be a distributed processor-accessible memory system including multiple processor-accessible memories communicatively connected to the data processing system 810 via a plurality of computers or devices. On the other hand, the data storage system 840 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 840 is shown separately from the data processing system 810, one skilled in the art will appreciate that the data storage system 840 may be stored completely or partially within the data processing system 810. Further in this regard, although the peripheral system 820 and the user interface system 830 are shown separately from the data processing system 810, one skilled in the art will appreciate that one or both of such systems may be stored completely or partially within the data processing system 810.

The peripheral system 820 may include one or more devices configured to provide digital content records to the data processing system 810. For example, the peripheral system 820 may include digital still cameras, digital video cameras, cellular phones, or other data processors. The data processing system 810, upon receipt of digital content records from a device in the peripheral system 820, may store such digital content records in the data storage system 840.

The user interface system 830 may include a mouse, a keyboard, another computer, or any device or combination of devices from which data is input to the data processing system 810. In this regard, although the peripheral system 820 is shown separately from the user interface system 830, the peripheral system 820 may be included as part of the user interface system 830.

The user interface system 830 also may include a display device, a processor-accessible memory, or any device or combination of devices to which data is output by the data processing system 810. In this regard, if the user interface system 830 includes a processor-accessible memory, such memory may be part of the data storage system 840 even though the user interface system 830 and the data storage system 840 are shown separately in FIG. 8.

Another embodiment of the present invention utilizes a hierarchical search featuring an image quality measure on the entire frame and an image quality measure of detected faces in the frame. In this embodiment, a Master List of reference key frames is first calculated from a video sequence using a key frame extraction algorithm such as the motion-based algorithms previously mentioned, as described above with respect to step 101. Other algorithms, such as those based on shot-boundary detection, may also be used. For the purpose of illustration in the following discussion, each reference key frame will be denoted $RKF_i$, where i is an integer between 1 the number of reference key frames in the Master List.

Next, a subset of the reference key frames from the Master List are designated as a Final List, as described above with respect to step 102. The Final List frames are designated based on a single quality metric, a combination of quality metrics, or some other measure.

In the next step of this embodiment, a sharpness score is calculated for each of a plurality of candidate frames that are adjacent to each reference key frame, $RKF_i$, in the Master List, as described above with respect to step 103. This sharpness score calculation is denoted herein by the notation SHARP (frame). The plurality of candidate frames may be a set number of frames immediately preceding each reference key frame in the video sequence, a set number of frames immediately following each reference key frame in the video sequence, or a set number of frames both preceding and following each reference key frame in the video sequence.

Next, a sharpness search is performed, wherein a frame will replace the reference key frame if the non-reference key frame has a sharpness greater than an absolute threshold. The absolute threshold can be determined by reference to the Master List. The absolute threshold can also be a preset constant, or can be computed from the full set of frames based on the average image quality in the frame set. This step results in a Second Master List, including the replacement reference key frames if any of the initial reference key frames are replaced. This step also results in a Second Final List. The Second Final List is identical to the initial Final List, except that any reference key frames replaced in the Second Master List are also replaced in the Second Final List with the same replacement frames.

During the sharpness search, there is a possibility that a frame can be promoted to the Second Final List even if the frame it is replacing is not in the Final List. Such promotion can occur when the sharpness of a frame is greater than the absolute threshold described above and the frame is substantially sharper than the initial reference key frame. Several methods can be used to determine when a frame is substantially sharper than a reference key frame. For example, an absolute sharpness difference can be preset, such that any frame that has a sharpness difference higher than the preset difference is considered to be substantially sharper than the initial reference key frame. Alternately, standard deviations of sharpness among the set of frames or any subset of frames can be calculated, and those standard deviations can be used to determine when a frame is substantially sharper than a reference key frame. For example, the difference between the sharpness of the frame and the sharpness of the initial reference key frame can be divided by the standard deviation described above to determine if the difference is greater than a threshold. If the difference is greater than a threshold, the frame can be considered as substantially sharper than the initial reference key frame. As a result of this type of promotion, it is possible for the Second Final List to contain more frames than the initial Final List.

After the sharpness search is completed, a search based on faceIVI is performed using the Second Master List, wherein a frame will replace the reference key frame if the non-reference key frame has a faceIVI score greater than an absolute threshold. The absolute threshold can be determined in a similar fashion to that described above with respect to the sharpness search. This step results in a Third Master List, including the replacement reference key frames if any of the reference key frames from the Second Master List are replaced. This step also results in a Third Final List. The Third Final List is identical to the Second Final List, except that any reference key frames replaced in the Third Master List are also replaced in the Third Final List with the same replacement frames.

As with the sharpness search, there is a possibility that a frame can be promoted to the Third Final List even if the frame it is replacing is not in the Second Final List. Such promotion can occur when a frame's faceIVI score is greater than the absolute threshold described above and the frame's faceIVI score is substantially greater than the reference key frame in the Second Master List. Several methods can be used to determine when a frame's faceIVI score is substantially greater than a reference key frame. For example, an absolute faceIVI score difference can be preset, such that any frame that has a faceIVI score higher than the preset difference is considered to have a faceIVI score substantially greater than the initial reference key frame. Alternately, standard deviations of faceIVI scores among the set of frames or any subset of frames can be calculated, and those standard deviations can be used to determine when a frame has a substantially greater faceIVI score than a reference key frame. For example, the difference between the faceIVI score of the frame and the faceIVI score of the reference key frame can be divided by the standard deviation described above to determine if the difference is greater than a threshold. If the difference is greater than the threshold, the frame can be considered to have a faceIVI score substantially greater than the initial reference key frame. As a result of this type of promotion, it is possible for the Third Final List to contain more frames than the Second Final List.

In the above described embodiment, the order of the sharpness search and the faceIVI search can be reversed, such that the faceIVI search is performed before the sharpness search. In addition, instead of computing a faceIVI score for each of the detected faces in a video frame, an image quality measure such as the sharpness of the bounded face region can be computed. This sharpness score will then be used to select the best frame with faces to be included in the Final list. It should be noted that other quality factors such as contrast, noise, facial expressions, can be used as a measure or a combination of measures in the evaluation.

The invention has been described in detail with particular reference to certain preferred embodiments thereof, but it will be understood that variations and modifications can be effected within the spirit and scope of the invention.

The invention claimed is:

1. A method of selecting key frames from a video sequence, comprising:

determining a master list of reference key frames using a key frame extraction algorithm; and for each reference key frame in the master list:

selecting a plurality of candidate frames adjacent to the reference key frame;

evaluating the plurality of candidate frames on one or more quality metrics;

selecting from the plurality of candidate frames a candidate key frame that yields an improvement over the reference key frame as measured by the one or more quality metrics; and replacing the reference key frame in the master list with the candidate key frame, wherein evaluating the plurality of candidate frames on one or more quality metrics comprises:

calculating a first quality metric score for each of the plurality of candidate frames;

selecting a first candidate frame from among the plurality of candidate frames, wherein the first candidate frame has the highest score for the first quality metric;

calculating a second quality metric score for each of the plurality of candidate frames;

selecting a second candidate frame from among the plurality of candidate frames, wherein the second candidate frame has the highest score for the second quality metric;

calculating a first aggregate quality improvement of the first candidate frame over the reference key frame; and calculating a second aggregate quality improvement of the second candidate frame over the reference key frame.

2. The method of claim 1, wherein selecting from the plurality of candidate frames a candidate key frame that yields an improvement over the reference key frame as measured by the one or more quality metrics comprises:

if the first aggregate quality improvement is greater than the second aggregate quality improvement and the first aggregate quality improvement indicates that the first candidate frame has a higher quality than the reference key frame, selecting the first candidate frame as the candidate key frame; and if the second aggregate quality improvement is greater than the first aggregate quality improvement and the second aggregate quality improvement indicates that the second candidate frame has a higher quality than the reference key frame, selecting the second candidate frame as the candidate key frame.

3. A method of selecting key frames from a video sequence, comprising:
- determining a master list of reference key frames using a key frame extraction algorithm;
- for each reference key frame in the master list:
  - determining a plurality of candidate frames associated with the reference key frame;
  - calculating a first quality metric score for each of the plurality of candidate frames;
  - selecting a first candidate frame from among the plurality of candidate frames, wherein the first candidate frame has the highest score for the first quality metric;
  - calculating a second quality metric score for each of the plurality of candidate frames;
  - selecting a second candidate frame from among the plurality of candidate frames, wherein the second candidate frame has the highest score for the second quality metric;
  - calculating a first aggregate quality improvement of the first candidate frame over the reference key frame;
  - calculating a second aggregate quality improvement of the second candidate frame over the reference key frame;
  - if the first aggregate quality improvement is greater than the second aggregate quality improvement and the first aggregate quality improvement indicates that the first candidate frame has a higher quality than the reference key frame, replacing the reference key frame in the master list with the first candidate frame; and
  - if the second aggregate quality improvement is greater than the first aggregate quality improvement and the second aggregate quality improvement indicates that the second candidate frame has a higher quality than the reference key frame, replacing the reference key frame in the master list with the second candidate frame.

4. The method of claim 3, wherein calculation of the first quality metric for a frame is based on the sharpness of the frame.

5. The method of claim 3, wherein calculation of the second quality metric for a frame comprises:
- detecting regions in the frame in which a human face appears; and
- evaluating the quality of the detected regions.

6. The method of claim 3, further comprising the following steps:
- designating a subset of reference key frames in the master list as final frames prior to performing any quality improvement replacements;
- creating a final list of key frames, wherein the final list comprises the final frames from the master list as modified by the quality improvement replacements; and
- adding to the final list of key frames any additional key frames from the master list for which the quality improvement replacements accomplished an aggregate improvement greater than a predefined threshold.

7. The method of claim 3, wherein determining a plurality of candidate frames associated with a reference key frame includes:
- determining whether any two pluralities of candidate frames share one or more candidate frames; and
- modifying one or both of the pluralities of candidate frames such that no candidate frame is shared by two pluralities of candidate frames.

8. A method of selecting a final list of key frames from a video sequence, comprising:
- determining a master list of reference key frames using a key frame extraction algorithm;
- designating a subset of reference key frames in the master list as final frames;
- for each reference key frame in the master list:
  - determining a plurality of candidate frames associated with the reference key frame;
  - calculating a first quality metric score for each of the plurality of candidate frames;
  - selecting a first candidate frame from among the plurality of candidate frames, wherein the first candidate frame has the highest score for the first quality metric;
  - calculating a second quality metric score for each of the plurality of candidate frames;
  - selecting a second candidate frame from among the plurality of candidate frames, wherein the second candidate frame has the highest score for the second quality metric;
  - calculating a first aggregate quality improvement of the first candidate frame over the reference key frame;
  - calculating a second aggregate quality improvement of the second candidate frame over the reference key frame;
  - if the first aggregate quality improvement is greater than the second aggregate quality improvement and the first aggregate quality improvement indicates that the first candidate frame has a higher quality than the reference key frame, replacing the reference key frame in the master list with the first candidate frame;
  - if the second aggregate quality improvement is greater than the first aggregate quality improvement and the second aggregate quality improvement indicates that the second candidate frame has a higher quality than the reference key frame, replacing the reference key frame in the master list with the second candidate frame;
- creating a final list of key frames, wherein the final list comprises the final frames from the master list as modified by the quality improvement replacements; and
- adding to the final list of key frames any additional key frames from the master list for which the quality improvement replacements accomplished an aggregate improvement greater than a set threshold.

9. The method of claim 8, wherein calculation of the first quality metric for a frame is based on the sharpness of the frame.

10. The method of claim 8, wherein calculation of the second quality metric for a frame comprises:
- detecting regions in the frame in which a human face appears; and
- evaluating the quality of the detected regions.

11. The method of claim 8, wherein determining a plurality of candidate frames associated with a reference key frame includes:
- determining whether any two pluralities of candidate frames share one or more candidate frames; and
- modifying one or both of the pluralities of candidate frames such that no candidate frame is shared by two pluralities of candidate frames.

12. A method of selecting key frames from a video sequence, comprising:
- determining a master list of reference key frames using a key frame extraction algorithm; and
- for each reference key frame in the master list:
- selecting a plurality of candidate frames adjacent to the reference key frame;
- evaluating the plurality of candidate frames on a first quality metric;
- selecting from the plurality of candidate frames a candidate key frame that yields an improvement over the reference key frame as measured by the first quality metric;

replacing the reference key frame in the master list with the candidate key frame;

selecting a plurality of candidate frames adjacent to the reference key frame;

evaluating the plurality of candidate frames on a second quality metric;

selecting from the plurality of candidate frames a candidate key frame that yields an improvement over the reference key frame as measured by the second quality metric;

replacing the reference key frame in the master list with the candidate key frame;

wherein calculation of the first quality metric for a frame is based on the sharpness of the frame, and wherein calculation of the second quality metric for a frame comprises detecting regions in the frame in which a human face appears and evaluating the quality of the detected regions.

13. A method of selecting key frames from a video sequence, comprising:

determining a master list of reference key frames using a key frame extraction algorithm; and for each reference key frame in the master list:

selecting a plurality of candidate frames adjacent to the reference key frame;

evaluating the plurality of candidate frames on one or more quality metrics;

selecting from the plurality of candidate frames a candidate key frame that yields an improvement over the reference key frame as measured by the one or more quality metrics;

replacing the reference key frame in the master list with the candidate key frame;

designating a subset of reference key frames in the master list as final frames prior to performing any quality improvement replacements;

creating a final list of key frames, wherein the final list comprises the final frames from the master list as modified by the quality improvement replacements; and adding to the final list of key frames any additional key frames from the master list for which the quality improvement replacements accomplished an aggregate improvement greater than a predefined threshold.

\* \* \* \* \*